US008261276B2

United States Patent
Bose et al.

(10) Patent No.: US 8,261,276 B2
(45) Date of Patent: Sep. 4, 2012

(54) POWER-EFFICIENT THREAD PRIORITY ENABLEMENT

(75) Inventors: Pradip Bose, Yorktown Heights, NY (US); Alper Buyuktosunoglu, White Plains, NY (US); Richard James Eickemeyer, Rochester, MN (US); Susan Elizabeth Eisen, Round Rock, TX (US); Michael Stephen Floyd, Cedar Park, TX (US); Hans Mikael Jacobson, White Plains, NY (US); Jeffrey R. Summers, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1192 days.

(21) Appl. No.: 12/059,576

(22) Filed: Mar. 31, 2008

(65) Prior Publication Data

US 2009/0249349 A1    Oct. 1, 2009

(51) Int. Cl.
    G06F 9/46     (2006.01)
    G06F 9/00     (2006.01)
    G06F 13/28    (2006.01)
    G06F 1/32     (2006.01)

(52) U.S. Cl. ........ 718/103; 718/108; 712/233; 711/135; 713/320; 713/321

(58) Field of Classification Search .................. None
    See application file for complete search history.

(56) References Cited

U.S. PATENT DOCUMENTS

| 6,658,447 | B2 | 12/2003 | Cota-Robles | |
|---|---|---|---|---|
| 2004/0073822 | A1 | 4/2004 | Greco et al. | |
| 2005/0149936 | A1 | 7/2005 | Pilkington | |
| 2006/0095806 | A1 | 5/2006 | Dai et al. | |
| 2006/0236136 | A1 | 10/2006 | Jones | |
| 2007/0113053 | A1 | 5/2007 | Jensen et al. | |
| 2009/0138682 | A1* | 5/2009 | Capps et al. | 712/220 |
| 2009/0217277 | A1* | 8/2009 | Johnson et al. | 718/102 |

OTHER PUBLICATIONS

Cazorla et al., "DCache Warn: an I-Fetch Policy to Increase SMT Efficiency", IEEE Computer Society, Proceedings of the 18th International Parallel and Distributed Processing Symposium, 2004.
Cazorla et al., "QoS for High-Performance SMT Processors in Embedded Systems", IEEE Computer Society, 2004, pp. 24-31.

* cited by examiner

Primary Examiner — Camquy Truong
(74) Attorney, Agent, or Firm — Yee & Associates, P.C.

(57) ABSTRACT

A mechanism for controlling instruction fetch and dispatch thread priority settings in a thread switch control register for reducing the occurrence of balance flushes and dispatch flushes for increased power performance of a simultaneous multi-threading data processing system. To achieve a target power efficiency mode of a processor, the illustrative embodiments receive an instruction or command from a higher-level system control to set a current power consumption of the processor. The illustrative embodiments determine a target power efficiency mode for the processor. Once the target power mode is determined, the illustrative embodiments update thread priority settings in a thread switch control register for an executing thread to control balance flush speculation and dispatch flush speculation to achieve the target power efficiency mode.

16 Claims, 9 Drawing Sheets

| TSCR FIELD | SEMANTICS |
|---|---|
| 502 — <gctdec:2><br>GCT DECODE PRIORITY CONTROL | IF ALL THREADS ARE AT THE SAME S/W SET PRIORITY, THEN:<br>01: DECREASE PRIORITY WHEN THREAD UTILIZES > "X1" NUMBER OF PROGRAMMABLE GCT ENTRIES<br>10: DECREASE PRIORITY WHEN THREAD UTILIZES > "Y1" NUMBER OF PROGRAMMABLE GCT ENTRIES<br>11: DECREASE PRIORITY WHEN THREAD UTILIZES > "Z1" NUMBER OF PROGRAMMABLE GCT ENTRIES<br>00: FUNCTION DISABLED |
| 504 — <bf:1><br>BALANCE FLUSH ENABLE/DISABLE | 0: ENABLE NTC BALANCE FLUSHES<br>1: DISABLE NTC BALANCE FLUSHES |
| 506 — <df:1><br>THREAD BALANCE DISPATCH FLUSH ENABLE/DISABLE | 0: ENABLE DISPATCH FLUSH FOR THE THREAD THAT WAS CHOSEN FOR A BALANCE FLUSH IF THAT THREAD IS STALLED AT DISPATCH<br>1: DISABLE DISPATCH FLUSH |
| 508 — <gctbf-a:2><br>GCT BALANCE FLUSH THRESHOLD FOR L3/TLB MISS | IF A THREAD IS STALLED AT DISPATCH WITH AN L3 OR TLB MISS, CONSIDER THREAD FOR BALANCE FLUSH:<br>01: WHEN THREAD UTILIZES >= "X2" NUMBER OF PROGRAMMABLE GCT ENTRIES<br>10: WHEN THREAD UTILIZES >= "Y2" NUMBER OF PROGRAMMABLE GCT ENTRIES<br>11: WHEN THREAD UTILIZES >= "Z2" NUMBER OF PROGRAMMABLE GCT ENTRIES<br>00: FUNCTION DISABLED |
| 510 — <gctbf-b:2><br>GCT BALANCE FLUSH THRESHOLD CONTROL (IF NO L3/TLB MISS) | IF A THREAD IS STALLED AT DISPATCH WITH NO L3 OR TLB MISSES, CONSIDER THREAD FOR BALANCE FLUSH:<br>01: WHEN THREAD UTILIZES >= "X3" NUMBER OF PROGRAMMABLE GCT ENTRIES<br>10: WHEN THREAD UTILIZES >= "Y3" NUMBER OF PROGRAMMABLE GCT ENTRIES<br>11: WHEN THREAD UTILIZES >= "Z3" NUMBER OF PROGRAMMABLE GCT ENTRIES<br>00: FUNCTION DISABLED |
| 512 — <bfmc:2><br>BALANCE FLUSH MISS COUNTER THRESHOLD CONTROL | IF A THREAD IS STALLED AT DISPATCH AND HAS AN L3 OR TLB MISS OUTSTANDING, ONLY CONSIDER THREAD FOR BALANCE FLUSH IF THE BALANCED FLUSH MISS CYCLE COUNTER IS LESS THAN:<br>00: FUNCTION DISABLED<br>01: "X4" NUMBER OF PROGRAMMABLE CYCLES<br>10: "Y4" NUMBER OF PROGRAMMABLE CYCLES<br>11: "Z4" NUMBER OF PROGRAMMABLE CYCLES |

*FIG. 5*

POWER-EFFICIENT THREAD PRIORITY ENABLEMENT

This invention was made with United States Government support under Agreement No. HR0011-07-9-0002 awarded by DARPA. The Government has certain rights in this invention.

BACKGROUND OF THE INVENTION

1. Field of the Invention

The present invention relates generally to an improved data processing system, and more specifically to controlling instruction fetch and dispatch thread priority settings in a thread switch control register for reducing the occurrence of balance flushes and dispatch flushes for increased power-performance efficiency of a simultaneous multi-threading data processing system.

2. Background Description

A symmetric multiprocessing (SMP) data processing system has multiple processors sharing global memory, where the operating system has a uniform view of all processors in the system. The operating system divides the work into tasks that are distributed among the various processors by dispatching one software thread of work to each processor at a time. Thus, a processor in an SMP system executes only one thread at a time.

A simultaneous multi-threading (SMT) processor is one that can concurrently execute more than one thread at a time. An SMP system can be made up of processors that support SMT or single-threaded mode of operation. An SMT system has the ability to favor one thread over another when both threads are running on the same processor. Simultaneous multithreaded processors often employ hardware or software mechanisms to control the priority of executing threads. Each processor in an SMT system can determine the priority of each thread that the processor is concurrently executing. The processor grants the thread that has the highest priority more decode units and more dispatch cycles, and makes other resources more available to that thread. Therefore, a higher priority thread will use more of the processor's resources and as a result do more work than the lower priority sibling threads on the same processor.

The objectives of controlling the priority of executing threads are typically to increase processor performance and maintain fairness across executing threads. Higher processor performance ensures higher utilization of processor resources, and fairness ensures that all executing threads are given equal opportunity and that no threads are forced to starve. The ability to control the flow of instructions in an SMT processor is important for performance improvements. When one thread is not making good progress, for performance reasons, the processor should allow another thread to have as much of the processor resources for the thread to make progress. There are several mechanisms built into microprocessors for controlling instruction flow as well as balancing work between threads. However, a consequence of existing thread priority control is excessive (and often avoidable or unnecessary) invocation of mechanisms such as balance flushes or dispatch flushes. While existing thread priority controls allow for increasing or maximizing processor performance, the inefficiencies caused by excessive or unnecessary flushes are a source of wasted power within multi-threaded processors.

BRIEF SUMMARY OF THE INVENTION

The illustrative embodiments provide a mechanism for controlling instruction fetch and dispatch thread priority settings in a thread switch control register for reducing the occurrence of balance flushes and dispatch flushes for increased power performance of a simultaneous multi-threading data processing system. To achieve a target power efficiency mode of a processor, the illustrative embodiments receive an instruction or command from a higher-level system control to set a current power consumption of the processor. The illustrative embodiments determine a target power efficiency mode for the processor. Once the target power mode is determined, the illustrative embodiments update thread priority settings in a thread switch control register for an executing thread to control balance flush and dispatch flush speculation to achieve the target power efficiency mode.

BRIEF DESCRIPTION OF THE SEVERAL VIEWS OF THE DRAWINGS

FIG. 5 illustrates a table comprising TSCR bit definitions in accordance with the illustrative embodiments;

DETAILED DESCRIPTION OF THE INVENTION

Figure 1:
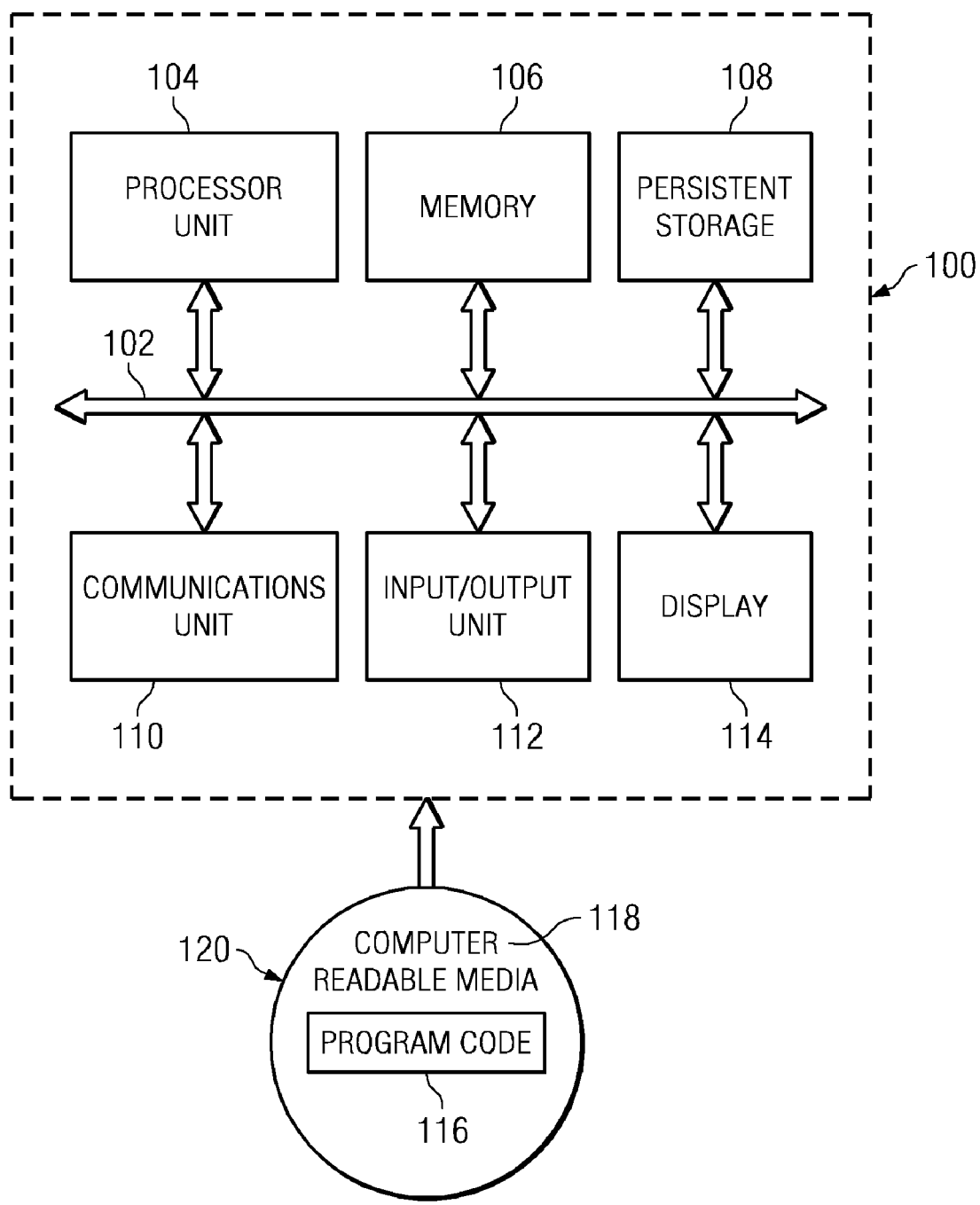
FIG. 1 is a block diagram of a data processing system in which the illustrative embodiments may be implemented.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 depicts a diagram of a data processing system in accordance with an illustrative embodiment of the present invention. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
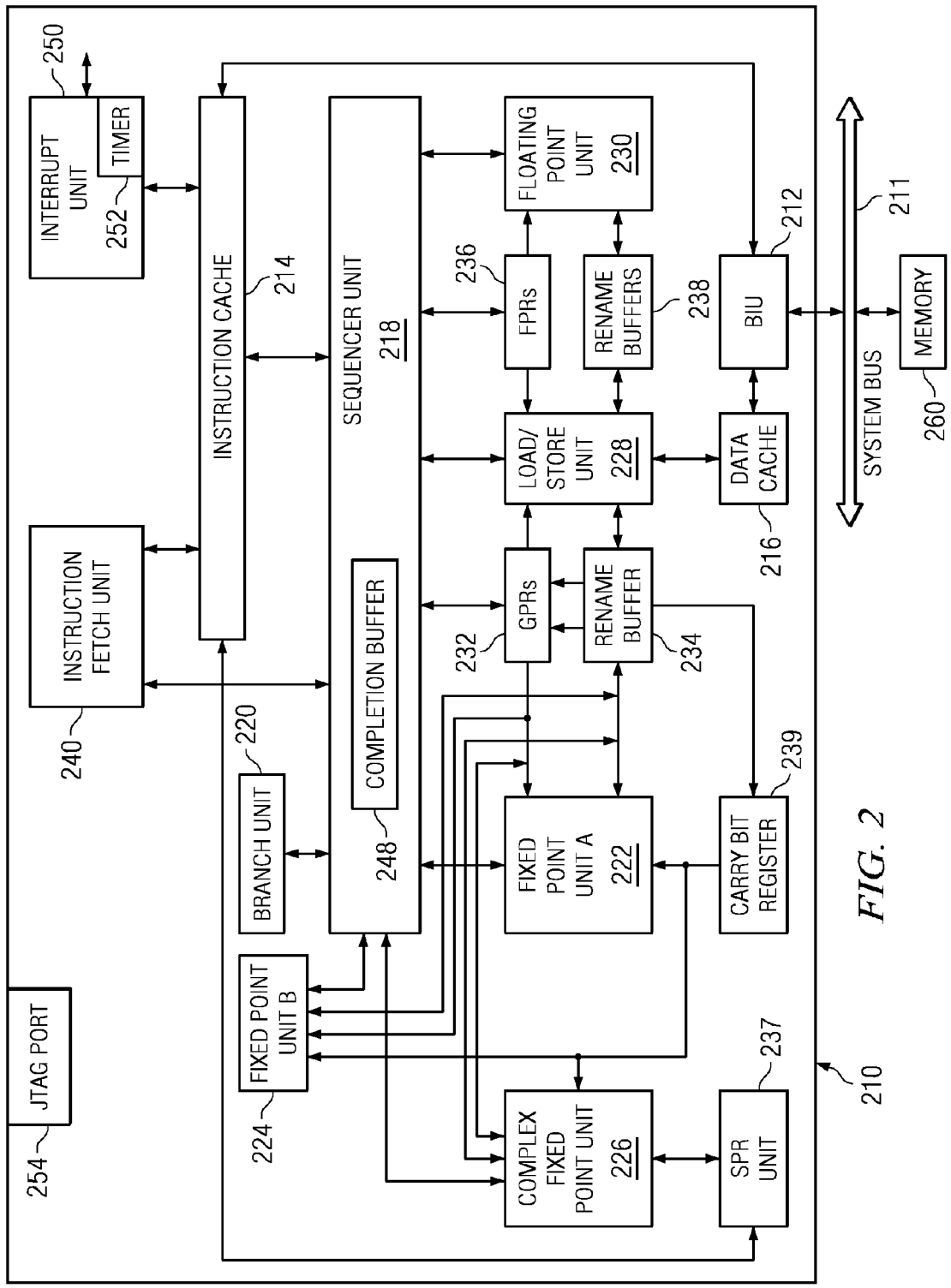
FIG. 2 is a block diagram of a multithreaded processor design showing functional units and registers in which the illustrative embodiments may be implemented.

FIG. 2 is a block diagram of a multithreaded processor design showing functional units and registers for implementing the illustrative embodiments. Processor 210 is an example of processor unit 104 in FIG. 1.

In an exemplary embodiment, processor 210 is a single integrated circuit superscalar microprocessor. Accordingly, as discussed further herein below, processor 210 includes various units, registers, buffers, memories, and other sections, all of which are formed by integrated circuitry. In addition, in an exemplary embodiment, processor 210 operates according to reduced instruction set computer ("RISC") techniques. As shown in FIG. 2, system bus 211 connects to bus interface unit ("BIU") 212 of processor 210. BIU 212 controls the transfer of information between processor 210 and system bus 211.

BIU 212 connects to an instruction cache 214 and to data cache 216 of processor 210. The instruction and data caches 214 and 216 may in general be implemented as a cache hierarchy of multiple levels: L1, L2, L3, . . . etc. Instruction cache 214 outputs instructions to sequencer unit 218. In response to such instructions from instruction cache 214, sequencer unit 218 selectively outputs instructions to other execution circuitry of processor 210. A translation lookaside buffer (TLB) is a table in the processor's memory that contains information about the pages in memory the processor accessed recently. The TLB may be used to translate virtual addresses—derived from the address generation mechanisms implicit in the user-level program code, as generated by sequencer unit 218 and load/store unit 228—into real or physical addresses that map into the actual memory address space allocated for the given application program.

In addition to sequencer unit 218, in an exemplary embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. In addition, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238. In response to a load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 causes instruction fetch unit 240 to fetch the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211. Embedded within (but not shown) sequencer unit 218 is an instruction decode unit and an instruction dispatch unit. The instruction decode unit decodes instructions and passes decoded instructions to the instruction dispatch unit. The instruction dispatch unit selectively groups decoded instructions from instruction decode unit for each thread, and outputs a group of instructions for each thread.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

Information stored at a selected one of fixed-point rename buffers 234 is associated with a storage location (e.g. one of GPRs 232 or carry bit (CA) register 239) as specified by the instruction for which the selected rename buffer is allocated. Information stored at a selected one of fixed-point rename buffers 234 is copied to its associated one of GPRs 232 (or CA register 239) in response to signals from sequencer unit 218. Sequencer unit 218 directs such copying of information stored at a selected one of fixed-point rename buffers 234 in response to "completing" the instruction that generated the information. Such copying is called "writeback."

Upon storing information at a selected one of floating-point rename buffers 238, such information is associated with one of FPRs 236. Information stored at a selected one of floating-point rename buffers 238 is copied to its associated one of FPRs 236 in response to signals from sequencer unit 218. Sequencer unit 218 directs such copying of information stored at a selected one of floating-point rename buffers 238 in response to "completing" the instruction that generated the information.

Within sequencer unit 218, completion buffer 248 tracks the completion of the multiple instructions, which are being executed within the execution units. Upon an indication that an instruction or a group of instructions have been completed successfully, in an application specified sequential order, completion buffer 248 may be utilized to initiate the transfer of the results of those completed instructions to the associated general-purpose registers. Completion buffer 248 comprises a global completion table (GCT) which keeps track of valid (live) instructions within the microprocessor from decode/dispatch through completion.

Additionally, processor 210 includes interrupt unit 250. Interrupt unit 250 connects to instruction cache 214. Additionally, although not shown in FIG. 2, interrupt unit 250 connects to other functional units within processor 210, including sequencer unit 218. Interrupt unit 250 may receive signals from other functional units and initiate an action, such as starting an error handling or trap process. In these examples, interrupt unit 250 generates interrupts and exceptions that may occur during execution of a program. Interrupt unit 250 includes timer 252.

Additionally, processor 210 includes JTAG port 254, which connects to an external service element, which is not shown. Latches comprise every element of processor 210. JTAG port 254 connects to all the latches that comprise the elements of processor 210.

The illustrative embodiments provide a mechanism for controlling the instruction fetch-side and dispatch-side thread priority settings in an SMT data processing system. A thread priority setting comprises bits set in a thread switch control register which indicate the priority level of a thread. In existing systems, a software control, such as a hypervisor, is typically the only mechanism which may read and update the bits in a thread switch control register to change the priority settings for the threads. The software control manages the thread priority settings in the thread switch control registers to improve the performance throughput of the processor and balance work between threads. However, a consequence of using thread priority settings to increase processor performance is the excessive invocation of mechanisms such as balance flushes and dispatch flushes. Invocation of these mechanisms is often avoidable or unnecessary, and the inefficiencies caused by excessive or unnecessary flushes results in wasted power. The illustrative embodiments provide a solution to this flush waste problem by providing a programmable algorithm for dynamically controlling the thread priority settings in the thread switch control register to control the power consumption of the system. The illustrative embodiments update the thread priority settings in the thread switch control registers based on a desired power efficiency mode. The thread priority settings associated with the desired power efficiency mode may override the default thread priority settings set by the software control. In this manner, the illustrative embodiments change the register settings to achieve a target power efficiency mode. In one embodiment, the programmable controls and algorithms reduce the occurrence of unnecessary balance flushes and dispatch flushes. Reducing the number of unnecessary balance flushes and dispatch flushes results in increased power-performance efficiency. The illustrative embodiments may achieve this increase in power-performance efficiency at the cost of impaired fairness across executing threads. However, in many cases, appropriate elimination of unnecessary balance and dispatch flushes may also result in net throughput performance increase, while simultaneously reducing flush waste.

Figure 3:
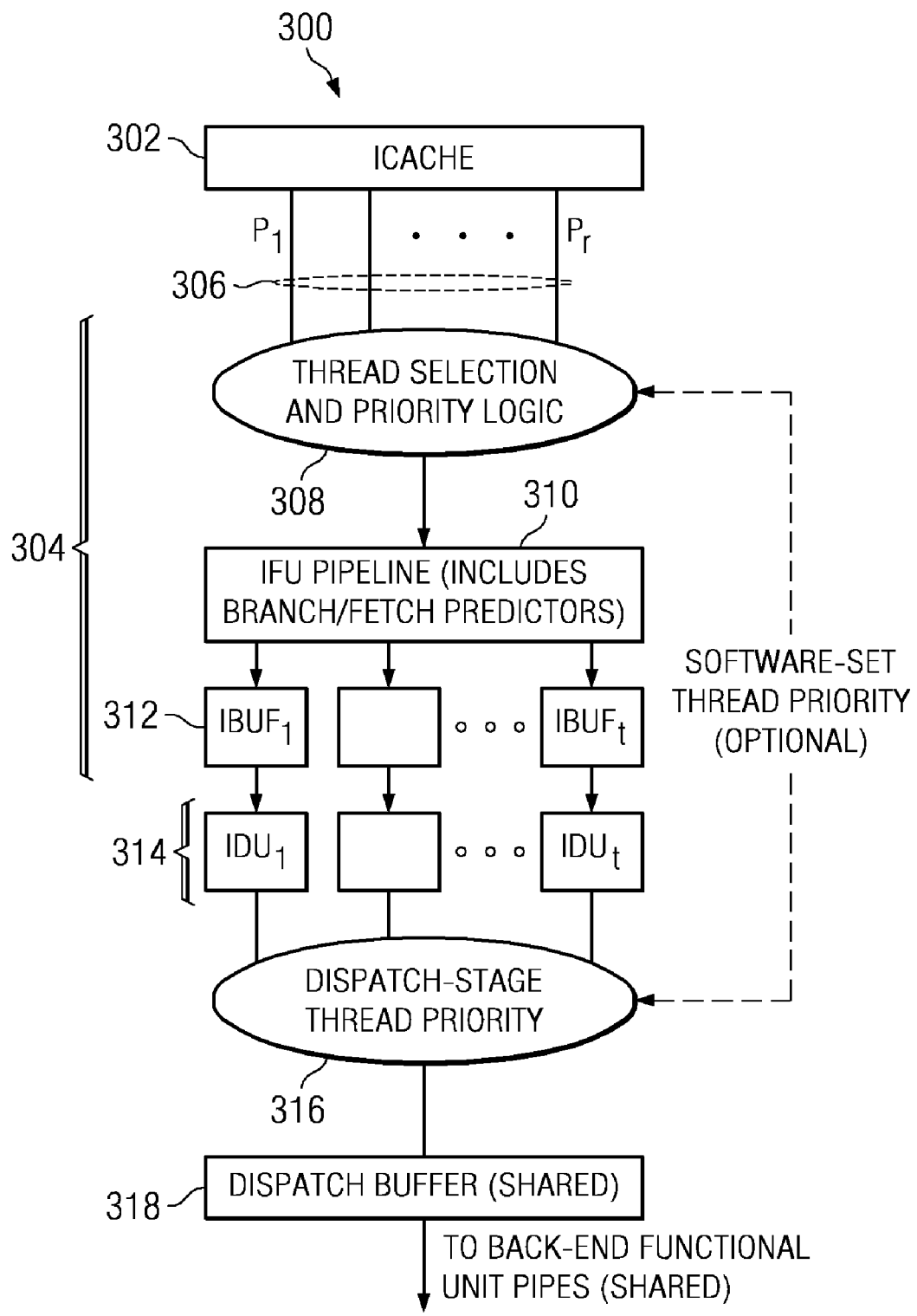
FIG. 3 is a block diagram of exemplary processor pipeline for controlling thread priority with which the illustrative embodiments may be implemented.

FIG. 3 is a block diagram of exemplary processor pipeline for controlling thread priority with which the illustrative embodiments may be implemented. In particular, FIG. 3 depicts the front-end of a processor pipeline implemented by a single superscalar microprocessor core (CPU) with SMT, such as ones available in IBM Corporation's p-series server systems (POWER5™ based systems and beyond). An example of the superscalar processor is processor 210 in FIG. 2.

A processor includes a number of stages in the processor pipeline. In a typical first stage, referred to as an instruction fetch stage, the processor fetches an instruction from memory or associative memory structure, each stage including one or more pipelines. Then, in a decode stage, the processor decodes the instruction into different control bits, which in general designate a type of functional unit for performing the operation specified by the instruction, source operands for the operation, and destinations for results of operations. In a dispatch stage, the processor dispatches the decoded instruction per the control bits to a unit having an execution stage, or possibly to an intervening reservation station or issue queue, which ultimately issues the instruction to an associated execution stage (also "execution unit"). The execution stage processes the operation as specified by the instruction. Executing an operation specified by an instruction includes accepting one or more operands and producing one or more results. A completion stage deals with program order issues that arise from concurrent execution, wherein multiple, concurrently executed instructions may deposit results in a single register. The completion stage also handles recovery issues arising from instructions subsequent to an interrupted instruction depositing results in their destination registers. This stage is also sometimes called a writeback stage since it is at this time that results of the execution of instructions are written back to designated locations such as registers.

In this illustrative example, processor front-end pipeline 300 includes shared instruction cache (ICache) 302 which holds instructions for multiple programs (threads) to be executed. The processor retrieves instructions from system memory, such as memory 106 in FIG. 1, and stores the instructions in instruction cache 302.

During the fetch stage, instruction fetch unit (IFU) 304 fetches instructions as needed from instruction cache 302 via read ICache read ports (P1 to Pr 306). Instruction fetch unit 304 requests instructions from instruction cache 302 according to an instruction address, and may, in general, request instructions from instruction cache 302 for a plurality of threads at the same time. Instruction fetch unit 304 comprises thread selection and priority logic 308 which assigns a fetch-stage priority level to each thread executed by the processor. Thread selection and priority logic 308 may be embedded within instruction fetch unit 240 in FIG. 2. A thread assigned a high priority may receive more decode units, more dispatch cycles, and other processor resources, while a lower priority thread is granted fewer resources. As threads are assigned priority levels, the instruction fetch unit pipeline 310 provides the threads (in priority order) to instruction buffers (IBUFs) 312 for supported threads.

During the decode and dispatch stage, instruction decode and dispatch units (IDUs) 314 decode instructions for concurrent threads. Instruction decode and dispatch units 314 also have an associated thread selection and priority logic 316 which controls the dispatch priority levels assigned to each thread executed by the processor. Thread selection and priority logic 316 may be embedded within sequencer unit 218 in FIG. 2, or thread selection and priority logic 316 may be a standalone unit connected to sequencer unit 218. Instruction decode and dispatch units 314 pass the prioritized instructions to shared dispatch buffer 318. Instruction decode and dispatch units 314 then dispatch instructions as appropriate from dispatch buffer 318 to the back-end execution units (not shown) in the system depicted in FIG. 3.

The architecture depicted in FIG. 3 is provided solely for the purpose of illustrating and explaining the embodiments of the present invention, and is not meant to imply any architectural limitations. Those skilled in the art will recognize that many variations are possible.

Figure 4:
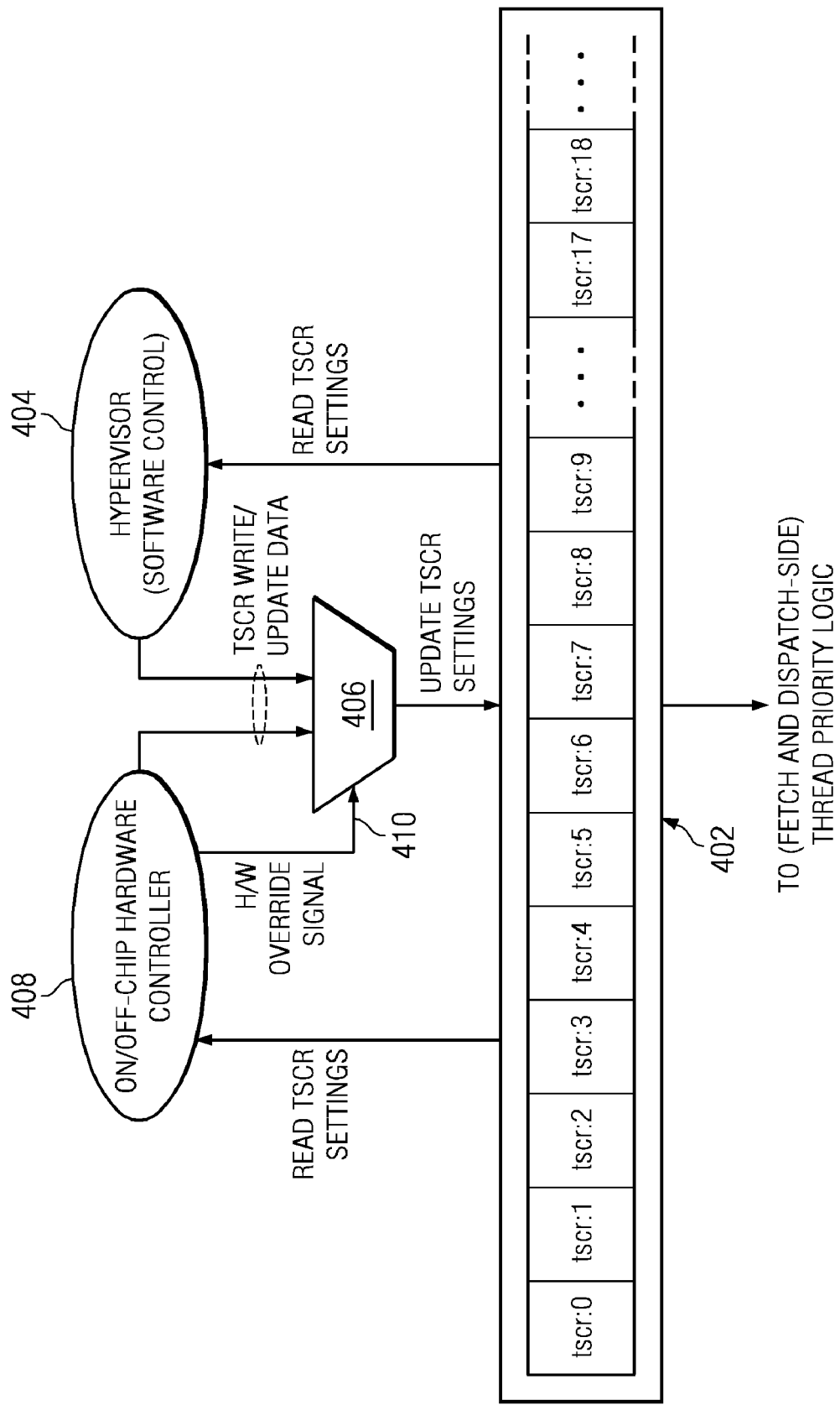
FIG. 4 is a block diagram of exemplary components for reading and writing to thread switch control registers (TSCRs) in accordance with the illustrative embodiments.

FIG. 4 is a block diagram of exemplary components for reading and writing to thread switch control registers, such as thread switch control register 402, in accordance with the illustrative embodiments. Thread switch control register 402 comprises a programmable hardware register. Each executing thread in an SMT data processing system has its own thread switch control register. Thread switch control register 402 comprises a plurality of bits (TSCR[0], TSCR[1], etc.) which are associated with one of a plurality of thread priority control settings. These settings are further defined in exemplary embodiments depicted in FIG. 5. The multithreaded processor uses the thread priority control setting associated with a bit in thread switch control register 402 to control instruction flow and handle competition among executing threads for securing various processing resources. In particular, thread selection and priority logic 308 and 316 in the processor pipeline in FIG. 3 use priority information obtained from the thread switch control registers to determine and set the priority levels of the executing threads. The exact number of bits constituting thread switch control register 402 is flexible, and the positional semantics of what each bit signifies is also dependent on the particular implementation.

In a typical SMT data processing system, a software controller such as hypervisor 404 is the only component which controls and updates the bit settings in the thread switch control registers. Hypervisor 404 provides default thread priority bit settings in thread switch control register 402 and may also change the enablement of the bit settings. Hypervisor 404 sets the thread priority bits in such a manner as to maximize throughput performance of the SMT processor, while maintaining fairness across executing threads. The embodiments of the present invention enable mechanisms that allow shared control of TSCR bit setting capability via hypervisor 404 or a hardware controller 408 that may reside on-chip or off-chip. Hypervisor 404 reads bit settings present in thread switch control register 402 and provides updated bit settings to multiplexer 406. Multiplexer 406 may then update the bit settings in thread switch control register 402 according to the settings provided by hypervisor 404.

On/off-chip hardware controller 408 is provided in the illustrative embodiments to dynamically change the enablement of bits in thread switch control register 402, and thereby override the default thread priority bit settings set by hypervisor 404. Hardware controller 408 reads bit settings in thread switch control register 402 and provides updated bit settings to multiplexer 406. Multiplexer 406 then updates the bit settings in thread switch control register 402 according to the settings provided by hardware controller 408. Hardware override signal 410 sourced by the hardware controller 408 allows multiplexer 406 to select the update commands from hardware controller 408 over the default commands provided by the hypervisor 404. Hardware controller 408 is ultimately also under system software control (link not shown), and usually, final override control is exercised by (hierarchical) system software represented through entities like the hypervisor and operating system. Hardware controller 408, in response to system-specified power targets for a given processor chip, may recognize the need to alter the default/prior TSCR settings in order to adjust the power level within each processor core. For example, hardware controller 408 may recognize the need to invoke a pre-specified "low power" mode for a given (set of) processor core(s). This recognition may lead hardware controller 408 to set hardware override signal 410 in order to provide multiplexer 406 the ability to select the updated TSCR setting commands from the hardware controller 408, instead of from the default source represented by the hypervisor 404.

In contrast with hypervisor 404, hardware controller 408 dynamically controls the thread priority settings in thread switch control register 402 to control the power consumption of the system. For instance, as already stated, if a lower power mode is desired, hardware controller 408 updates the priority bit settings appropriately to result in low power consumption. The stipulated low power mode level (e.g. low, medium or high) is either inferred autonomously by hardware controller 408 (in response to currently monitored power levels and their relation to power targets specified by system-level directives), or is directly communicated by system-level control. Whether or not to invoke the thread priority control knob and what the new TSCR settings should be to effect desired power reduction, are decisions that are part of the logic incorporated in the controller (implemented in hardware or through programmed software/firmware running on the controller). By changing the priority bit settings to increase power-performance efficiency, the throughput performance of the multithreaded processor may decrease and the fairness across the executing threads may decrease. However, changing the priority bit settings to achieve a desired power consumption mode may, in many cases, result in both increased power efficiency and increased net throughput performance because disabling a certain category of flushes may allow higher performance threads to grab the majority of resources. Consequently, changing the priority bit settings to achieve a desired power consumption mode may enhance throughput performance at the cost of hurting fairness criteria.

FIG. 5 illustrates a table comprising example TSCR bit definitions in accordance with the illustrative embodiments. In this illustrative example, the 2-bit field <gctdec:2> 502 of thread switch control register 402 in FIG. 4 defines the global completion table (GCT) decode priority control. The global completion table is a hardware entity that keeps track of valid (live) instructions within the microprocessor from decode/dispatch through completion. Physically, the global completion table may be implemented as part of the functionality of completion buffer 248 indicated in FIG. 2. The global completion table decode priority control specifies the threshold levels for changing the priority level of a thread based on how many global completion table entries are utilized by the thread. When all threads executing have the same software-set priority level, thread selection and priority logic 308 and 316 in the processor pipeline in FIG. 3 will decrease the priority of a thread if the thread is utilizing more than a specified number of global completion table entries. For instance, if <gctdec:2> in the thread switch control register is set to "10", the priority of the thread will be decreased if the thread is using more than a programmable threshold in terms of the number of entries within the GCT. If <gctdec:2> in the thread switch control register is set to "00", the global completion table decode priority control is disabled, and no action is taken. This 2-bit field <gctdec:2> is also used to trade off power and performance.

The 1-bit field <bf:1> 504 of thread switch control register 402 in FIG. 4 defines the enablement/disablement setting of the balance flush. A balance flush is a thread control mechanism which flushes a stalled and/or resource-consuming target thread entirely from the system to restore resource usage fairness or balance. The balance flush comprises a next-to-complete instruction flush (NTC+1) which flushes all instruction groups on a selected thread following the next-to-complete instruction group. The NTC+1 balance flush flushes the execution units, the global completion table, and the effective address table (EAT) for the selected thread. The effective address table is a hardware entity, linked to the global completion table, which maintains various attributes related to the live machine instructions tracked by the global completion table. Threads are balance flushed only if a thread is stalled at dispatch. Balance flushes may be enabled or disabled using the <bf:1> field within the thread switch control register.

The 1-bit field <df:1> 506 of thread switch control register 402 in FIG. 4 defines the enablement/disablement setting of the dispatch flush. A dispatch flush is a thread control mechanism which flushes stalled, in-flight instructions in the dispatch pipeline. A thread may be "stalled at dispatch" due to unavailability of a shared resource that the thread needs for the next dispatch. Dispatch flushes may be enabled or disabled using the <df:1> field within the thread switch control register.

The 2-bit field <gctbf-a:2> 508 of thread switch control register 402 in FIG. 4 defines the global completion table balance flush threshold control for L3 cache and TLB misses. An L3 cache or TLB miss occurs when the L3 cache or TLB does not to contain data with the desired tag. If a thread stalls at dispatch due to an L3 or TLB miss, the thread may be balance flushed. For instance, if the bit pair <gctbf-a:2> in the thread switch control register is set to "01", a balance flush will be performed on the thread if the thread is utilizing at least a programmable minimum number of global completion table entries. If bit pair <gctbf-a:2> is set to "10", or "11" the microprocessor performs a balance flush on the thread if the thread is utilizing other different programmable thresholds in terms of number of global completion table entries. Setting the <gctbf-a:2> field in the thread switch control register to "00" disables the balance flush threshold control.

The 2-bit field <gctbf-b:2> 510 of thread switch control register 402 in FIG. 4 defines the global completion table balance flush threshold control with no L3 cache and TLB misses. A thread with no L3 cache or TLB misses may be balance flushed based on bit pair <gctbf-b:2>. As before, depending on programmable, pre-defined threshold values in the number of utilized GCT entries, a given thread may be balance flushed. Setting the <gctbf-b:2> field to "00" disables the balance flush threshold control.

The 2-bit field <bfmc:2> 512 of thread switch control register 402 in FIG. 4 defines the global completion table balance flush miss counter threshold control. If a thread stalls at dispatch and has an L3 cache or TLB miss outstanding, the thread is only considered for a balance flush if the balance flush miss cycle counter is less than a specific number of cycles. The 2-bit encoding in <bfmc:2> (e.g. "01", "10" or "11") specifies programmable thresholds in the balance flush miss cycle counter value to trigger this class of balance flushes. Setting the <bfmc:2> field to one of the encoding patterns (e.g. "00") disables the balance flush miss counter threshold control mechanism.

As previously mentioned, there are several instruction flow control mechanisms built into microprocessors for controlling instruction flow, as well as balancing work between threads. These instruction flow control mechanisms include balance flushes and dispatch flushes. The programmable algorithm of the illustrative embodiments utilize these instruction control flow mechanisms to dynamically control the power consumption of the system by updating the thread priority settings in the thread switch control registers based on a desired power efficiency mode. The thread priority settings associated with the desired power efficiency mode may override the default thread priority settings set by the software control. In this manner, the illustrative embodiments change the register settings to achieve a target power efficiency mode.

Balance Flush

This mechanism comprises a thread control algorithm that flushes a stalled and/or resource-consuming target thread entirely from the system to restore resource usage fairness or balance. The programmable algorithm of the illustrative embodiments changes the thread priority settings of stalled or resource-consuming threads to prevent (disable) or allow (enable) the occurrence of balance flushes as necessary to increase the power efficiency of the processor to a target power efficiency mode. A balance flush may be disabled or enabled using a specific bit 504 in the TSCR as previously mentioned in the context of FIG. 5. The balance flush (NTC+1) flushes all instruction groups on a selected thread following the next-to-complete instruction group. The balance flush also flushes the execution units, the global completion table, and the effective address table (EAT) for the selected thread. A thread may be balance flushed only if the thread stalls at dispatch.

The mechanism follows various criteria for selecting threads as candidates for a balance flush. A thread may be "stalled at dispatch" due to unavailability of a shared resource that it needs for the next dispatch. Examples of the unavailability of a shared resource include no available issue queue entries, no available rename registers available, or when the global completion table is full. Instructions such as sync, lwsync, ptesync, tlbsync, tlbie, and instructions with the scoreboard bit set can cause a dispatch flush on the multithreaded processor. When the stall condition occurs, the microprocessor holds the decode pipe. If the processor core is in SMT2 or SMT4 mode and more than one thread is active, then on a dispatch stall, the mechanism selects the thread(s) with any number of L3 cache or TLB misses if the balance flush miss counter for the thread is less than the counter threshold as described by the <bfmc:2> field 512 in FIG. 5. If the miss counter for the thread is greater than the threshold value, the mechanism ignores the miss on that thread and does not consider the thread for a balance flush. If there is only one thread selected based on L3 cache or TLB misses, the mechanism selects that thread to be balanced flushed. If there is more than one thread selected based on L3 cache or TLB misses, the mechanism checks whether the <gctbf-a:2> (field 508 in FIG. 5) condition is satisfied for all of the threads. For threads that meet the <gctbf-a:2> criteria, the thread with the most global completion table usage is selected for balance flush. If global completion table usage is the same across the threads, then the mechanism randomly selects a thread to be balanced flushed. If no thread has an L3 cache or TLB miss, the mechanism selects the thread with more than the number of global completion table entries as reflected by balance flush no miss global completion table threshold <gctbf-b:2> field 510 in FIG. 5. If the thread that is stalled at dispatch is also the thread that was chosen to be balanced flushed, then the mechanism also performs a dispatch flush on that thread if the 1-bit field <df:1> 506 in FIG. 5 is enabled. Otherwise, the mechanism only performs a balance flush on the chosen thread.

Dispatch Flush

This mechanism comprises a thread control algorithm that flushes stalled, in-flight instructions in the dispatch pipeline. A dispatch flush is a low latency flush that flushes the decode pipe. The programmable algorithm of the illustrative embodiments changes the thread priority settings of stalled instructions to prevent (disable) or allow (enable) the occurrence of dispatch flushes as necessary to increase the power efficiency of the processor to a target power efficiency mode. A dispatch flush may be disabled or enabled using <df:1> 506 (in FIG. 5) in the thread switch control register.

If a thread is in dispatch stall and if the dispatch flush bit in the thread switch control register is enabled, and if that thread is previously balanced flushed, then this thread will be dispatch flushed if the chosen thread stalls at dispatch.

Figure 6:
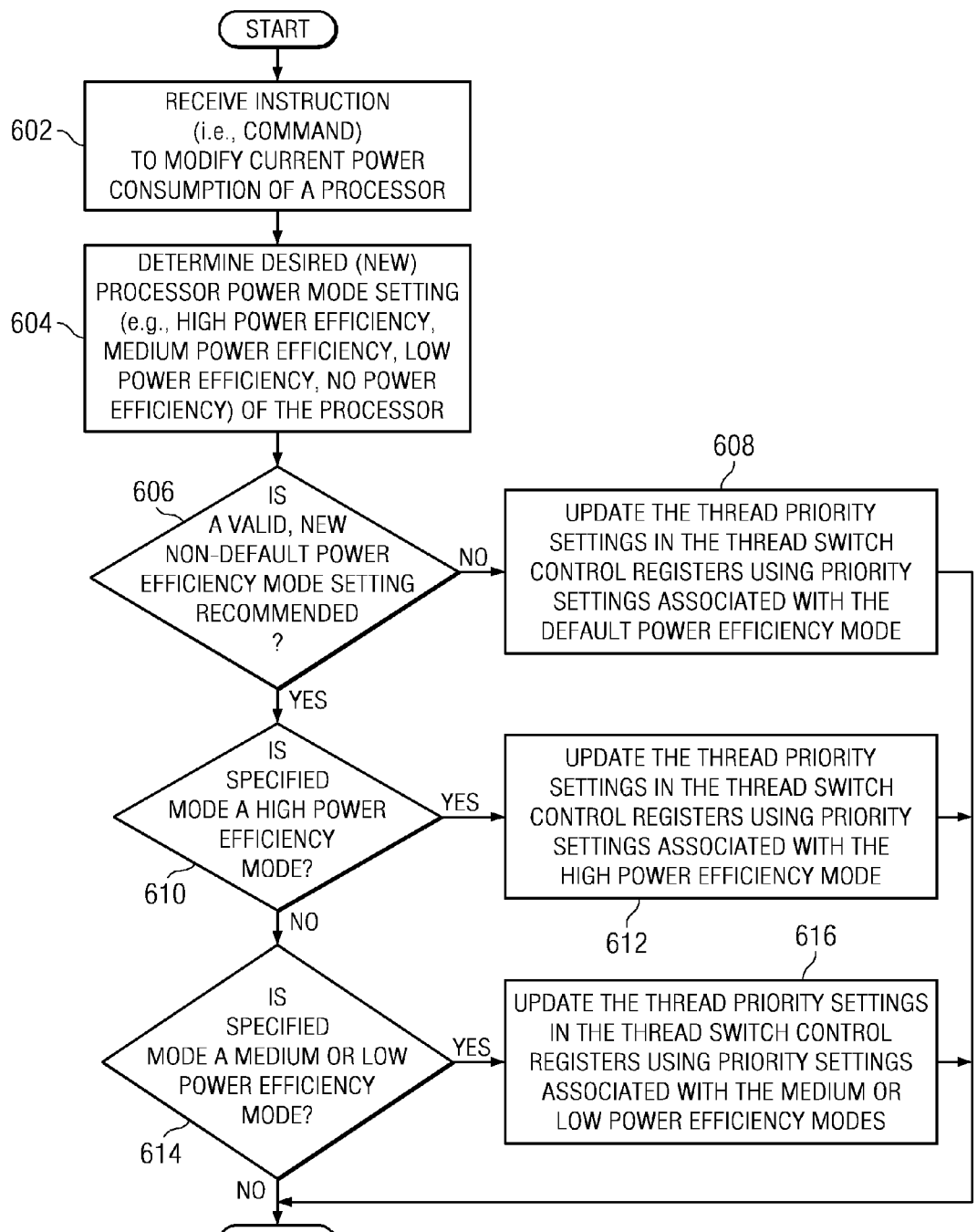
FIG. 6 is a flowchart of a process for controlling instruction fetch and dispatch thread priority settings to reduce the occurrence of balance flushes and dispatch flushes for increased power performance in accordance with the illustrative embodiments.

FIG. 6 is a flowchart of a process for overriding default or current fetch and dispatch thread priority settings associated with bits set in the thread switch control registers in accordance with the illustrative embodiments. The process described in FIG. 6 may be implemented as part of the software/firmware programmed into the hardware controller 408 in FIG. 4. The process utilizes existing instruction control flow mechanisms, such as performing balance flushes dispatch flushes to increase the power consumption efficiency of an SMT processor. The process describes updating the bits in the thread switch control registers to override the default existing thread priority bit settings in the thread switch control registers. The fetch thread selection and priority logic and the dispatch thread selection and priority logic (e.g., logic 308 and 316 in FIG. 3, respectively) reads the updated thread priority settings associated with the bits in the registers, and manages the power efficiency of the processor using these thread priority settings.

The process begins with the on/off-chip hardware controller, such as hardware controller 408 in FIG. 4, receiving an instruction (i.e., command) to modify the current power consumption of the processor (step 602) from higher-level system software, possibly under manual intervention at the system- or datacenter level, in response to a power- or performance-related deficiency. In some systems, the system-level command response could conceivably be part of a fully automated feedback control loop that generates such commands autonomously, based on monitored power/temperature and performance metrics across the system. The process then makes a determination of the desired, new power mode setting for a given processor core (or a chiplet region that contains a core plus additional L2/L3 cache components) (step 604). The desired power mode may include, for example, high, medium, and low power efficiency modes. A power efficiency mode is an operational mode which aims to conserve the power consumption of the processor via thread priority settings. Selecting a low power efficiency mode provides a small increase in the power efficiency of the processor, while selecting a high power efficiency mode provides a large increase in the power efficiency of the processor. A high power efficiency mode involves several microarchitectural changes; one of these, pertaining to the particular scope of this invention, comprises thread priority settings which disable all balance flush and dispatch flush speculation in order to minimize unnecessary and wasteful flush operations. Medium and low power efficiency modes have similar priority settings which do not completely disable, but limit the likelihood of balance flushes and dispatch flushes to varying degrees, to conserve power at relatively smaller performance costs. The desired power mode may also include no efficiency mode, or the default power efficiency mode. Selection of the default power mode returns the thread priority settings in the thread switch control register to priority settings provided by the hypervisor to maximize the processor throughput performance while maintaining fairness across executing threads.

The process then makes a determination as to whether a valid new, non-default power efficiency mode setting is being recommended (step 606). If no new, non-default power efficiency mode is specified (e.g., None) ('no' output of step 606), the process uses the default power efficiency mode comprising performance-based thread priority settings provided by the software control, such as hypervisor 404 in FIG. 4, to update the bits in each thread switch control register for each of the executing threads (step 608). These thread priority settings provided by the software control comprise bit settings which allow processor performance to operate at a maximum level.

Turning back to step 606, if a valid new, non-default power efficiency mode is specified ('yes' output of step 606), the process makes a determination as to whether the power efficiency mode recommended for the processor is a high power efficiency mode (e.g., "High") (step 610). If the setting recommended in step 610 is a high power efficiency mode for the processor ('yes' output of step 610), the process uses the high power efficiency thread priority settings to update appropriate bits in each thread switch control register for each of the executing threads to disable all balance and dispatch flush speculation for the executing threads (step 612). In this manner, the process allows the high power efficiency thread priority settings provided by the hardware controller for increasing the power efficiency of the processor to override the processor performance-based thread priority settings provided by the software controller.

As presented in prior description in this application, the process in step 612 updates the balance flush bit <bf:1> 502 (in FIG. 5) to disable all NTC balance flushes, and updates dispatch flush bit <df:1> 506 (in FIG. 5) to disable all dispatch flushes. The settings in other TSCR fields are now irrelevant from the perspective of this invention, and relevant fields that disable balance or dispatch flush functionality are set accordingly. The process no longer considers threads for balance or dispatch flushes.

Turning back to step 610, if the recommended setting is not a high power efficiency mode for the processor ('no' output of step 610), the process makes a determination as to whether the power efficiency mode recommended for the processor is a medium or low power efficiency mode (e.g., "Medium" or "Low") (step 614). The medium and low power efficiency modes may or may not provide enough power differentiation to utilize different priority settings in the thread switch control register. In case there is a determination that there is not enough differentiation, the same priority settings may be used in one power mode as the other power mode. Thus, if the recommended setting specifies a medium or low power efficiency mode for the processor ('yes' output of step 614), the process uses the medium or low power efficiency thread priority settings provided by the embedded software/firmware resident on hardware controller 408 in FIG. 4, to update the relevant TSCR fields in each thread switch control register for each of the executing threads (step 616). For example, the process in step 616 updates the balance flush bit <bf:1> 504 (in FIG. 5) to enable all NTC balance flushes, and updates dispatch flush bit <df:1> 506 (in FIG. 5) to enable all dispatch flushes. The process also updates balance flush bit <gctbf-a:2> 508 (in FIG. 5) to "11" to specify that the thread is a candidate for balance flush if the thread is stalled at dispatch with an L3 or TLB miss and the thread utilizes more than or equal to a defined programmable number of GCT entries. The process also updates balance flush bit <gctbf-b:2> 510 (in FIG. 5) to "11" to specify that the thread is a candidate for balance flush if the thread is stalled at dispatch with no L3 or TLB misses and the thread utilizes more than or equal to a defined programmable number of GCT entries. The process further updates balance flush bit <bfmc:2> 512 (in FIG. 5) to "01" to specify that the thread is a candidate for balance flush if the thread is stalled at dispatch with L3 or TLB misses and the balance flush miss cycle counter is less than a defined programmable number of cycles.

The update of the bits in the thread switch control registers limits the likelihood that performance of balance and dispatch flushes will occur on executing threads to reduce power waste, with acceptable margins on performance loss. The process allows the medium and low power efficiency thread priority settings provided by the hardware controller for increasing the power efficiency of the processor to override the processor performance-based thread priority settings provided by the software controller.

Figure 7:
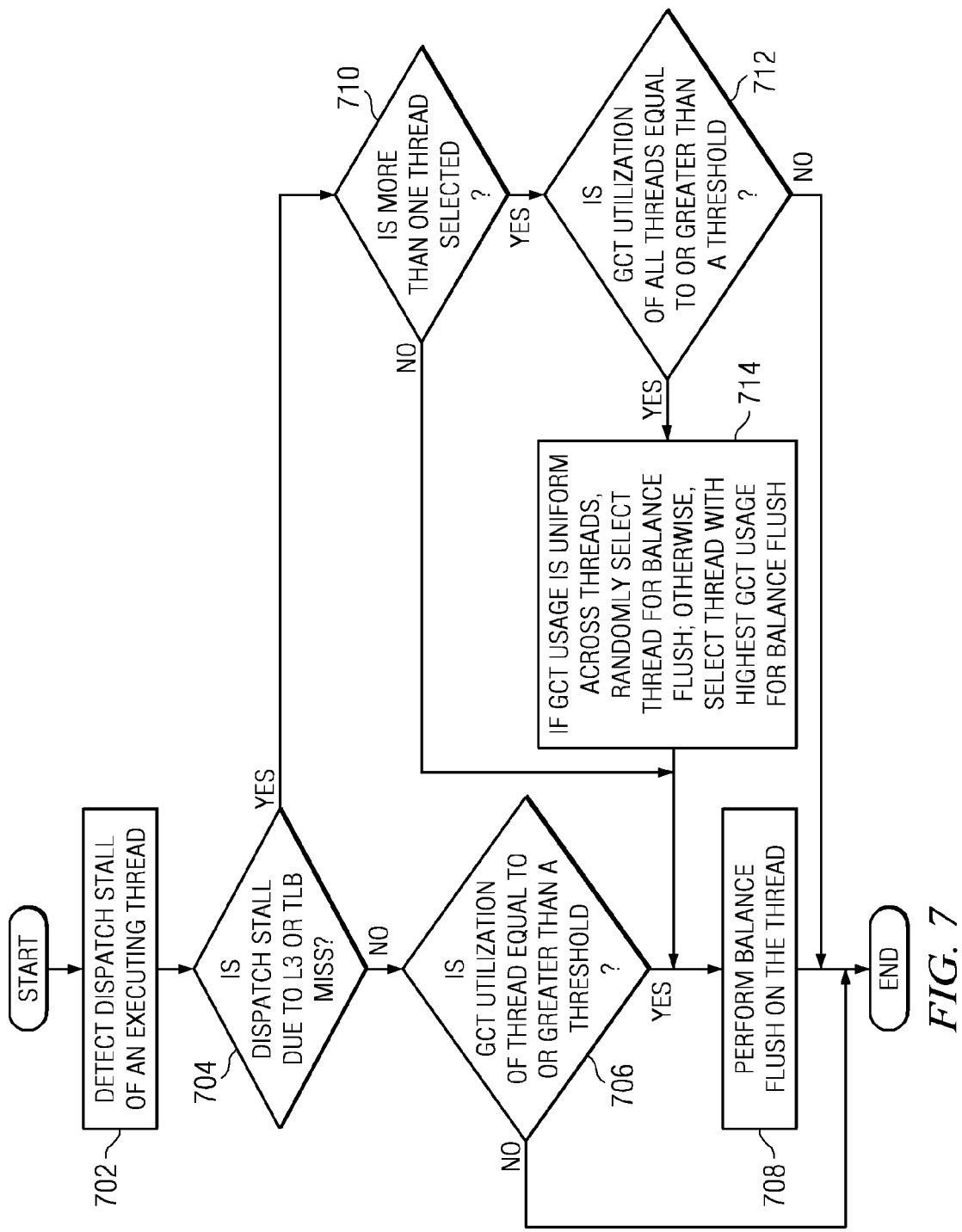
FIG. 7 illustrates a flowchart of a process for balance flushing threads in accordance with the illustrative embodiments.

FIG. 7 illustrates a flowchart of a process for balance flushing threads in accordance with the illustrative embodiments. The process may be used in tandem with the process in FIG. 6 for overriding default or current fetch and dispatch thread priority settings associated with bits set in the thread switch control registers.

The process begins with detecting a dispatch stall for a thread in the process pipeline (step 702). When detecting a dispatch stall, the process determines if the dispatch stall is due to a L3 cache miss or a TLB miss (step 704). If the dispatch stall is not due to a L3 cache miss or a TLB miss ('no' output of step 704), the process makes a determination whether the thread is a candidate for balance flush based on the GCT utilization of the thread (as defined by balance flush bits <gctbf-b:2> (510 in FIG. 5) in the thread switch control register) (step 706). If the GCT utilization of the thread is equal to or greater than a utilization threshold value as described by the <gctbf-b:2> field (510 in FIG. 5) ('yes' output of step 706), the process initiates a balance flush on the target thread to flush the target thread entirely from the system to restore resource usage fairness or balance (step 708). The balance flush includes flushing the execution units, the global completion table, and the effective address table for the selected thread. If the GCT utilization of the thread is less than a utilization threshold value as described by the <gctbf-b:2> field (510 in FIG. 5) ('no' output of step 706), the process does not consider the thread for balance flush, and the process terminates thereafter.

Turning back to step 704, if the process determines that the dispatch stall is due to a L3 cache miss or a TLB miss ('yes' output of step 704), the process determines if more than one thread is selected based on the L3 cache or TLB misses (step 710). If no more than one thread is selected ('no' output of step 710), the process initiates a balance flush on the target thread to flush the target thread entirely from the system to restore resource usage fairness or balance (step 708).

If more than one thread is selected based on L3 cache or TLB misses ('yes' output of step 710), the process determines whether the <gctbf-a:2> (field 508 in FIG. 5) condition is satisfied for all of the threads (step 712). For threads that meet the <gctbf-a:2> criteria ('yes' output of step 712), the process selects the thread with the most global completion table usage for balance flush or, if GCT usage is uniform across the threads, the process randomly selects a thread for balance flush (step 714). The process then initiates a balance flush on the selected thread to flush the target thread entirely from the system to restore resource usage fairness or balance (step 708). For threads that do not meet the <gctbf-a:2> criteria ('no' output of step 712), the process terminates thereafter.

Figure 8:
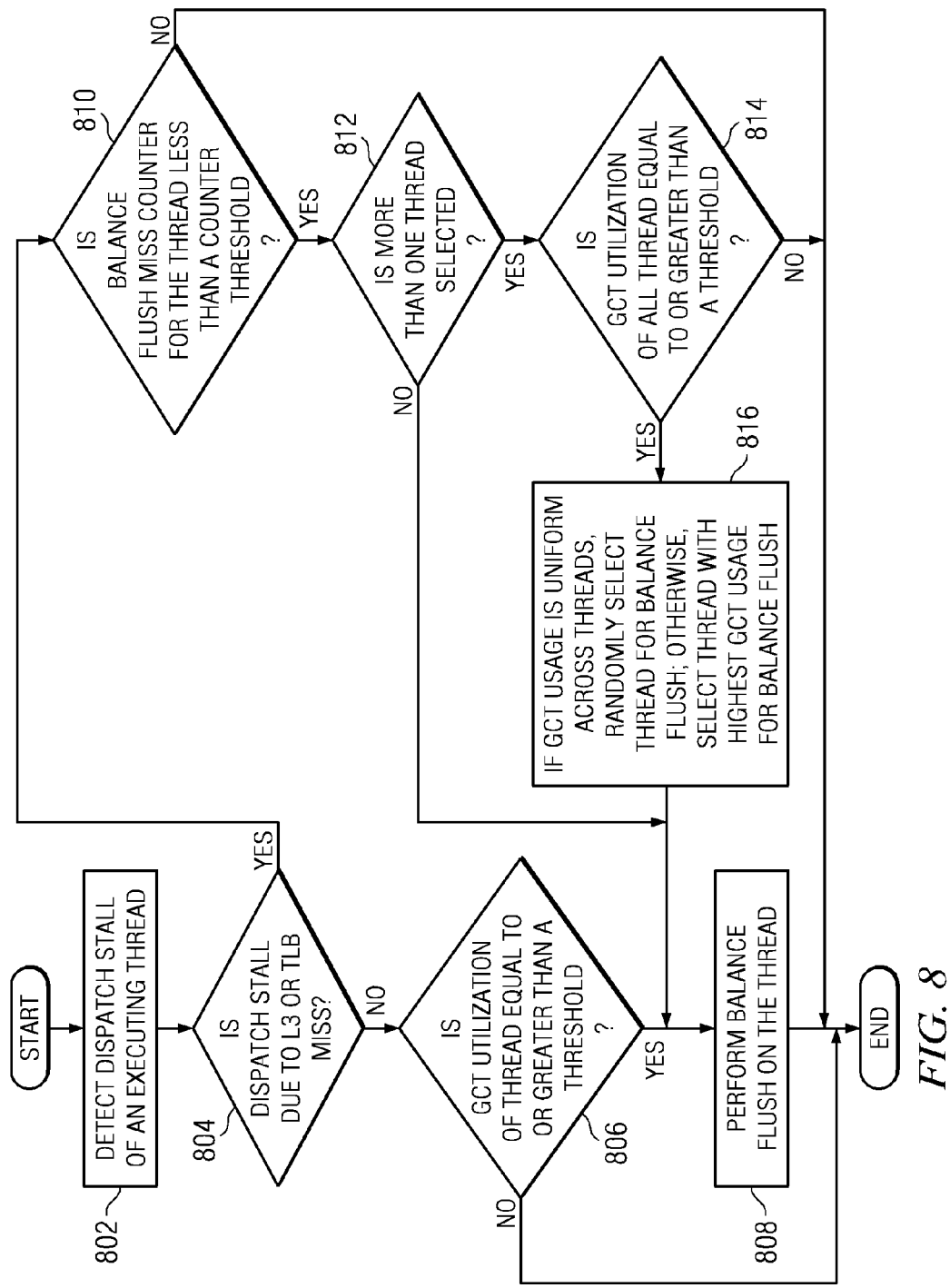
FIG. 8 illustrates a flowchart of an alternative process for balance flushing threads in accordance with the illustrative embodiments.

FIG. 8 illustrates a flowchart of a process for controlling the occurrence of balance flushes using a balance flush miss counter in accordance with the illustrative embodiments. The process may be used in tandem with the process in FIG. 6 for overriding default or current fetch and dispatch thread priority settings associated with bits set in the thread switch control registers.

The process begins with detecting a dispatch stall for a thread in the process pipeline (step 802). When detecting a dispatch stall, the process determines if the dispatch stall is due to a L3 cache miss or a TLB miss (step 804). If the dispatch stall is not due to a L3 cache miss or a TLB miss ('no' output of step 804), the process makes a determination whether the thread is a candidate for balance flush based on the GCT utilization of the thread (as defined by balance flush bits <gctbf-b:2> (510 in FIG. 5) in the thread switch control register) (step 806). If the GCT utilization of the thread is equal to or greater than a utilization threshold value as described by the <gctbf-b:2> field (510 in FIG. 5) ('yes' output of step 806), the process initiates a balance flush on the target thread to flush the target thread entirely from the system to restore resource usage fairness or balance (step 808). If the GCT utilization of the thread is less than a utilization threshold value as described by the <gctbf-b:2> field (510 in FIG. 5) ('no' output of step 806), the process does not consider the thread for balance flush, and the process terminates thereafter.

Turning back to step 804, if the process determines that the dispatch stall is due to a L3 cache miss or a TLB miss ('yes' output of step 804), the process determines if the balance flush miss counter for the thread is less than the counter threshold as described by the <bfmc:2> field (512 in FIG. 5) (step 810). If the miss counter for the thread is less than the counter threshold value associated with the setting in the <bfmc:2> field in the thread switch control register ('yes' output of step 810), the process determines if more than one thread is selected based on the L3 cache or TLB misses (step 812). If no more than one thread is selected ('no' output of step 812), the process initiates a balance flush on the target thread to flush the target thread entirely from the system to restore resource usage fairness or balance (step 808).

If more than one thread is selected based on L3 cache or TLB misses ('yes' output of step 812), the process determines whether the <gctbf-a:2> (field 508 in FIG. 5) condition is satisfied for all of the threads (step 814). For threads that meet the <gctbf-a:2> criteria ('yes' output of step 814), the process selects the thread with the most global completion table usage for balance flush or, if GCT usage is uniform across the threads, the process randomly selects a thread for balance flush (step 816). The process then initiates a balance flush on the selected thread to flush the target thread entirely from the system to restore resource usage fairness or balance (step 808). For threads that do not meet the <gctbf-a:2> criteria ('no' output of step 814), the process terminates thereafter.

Turning back to step 810, if the miss counter for the thread is greater than or equal to the threshold value ('no' output of step 810), the process ignores the miss on that thread and does not consider the thread for a balance flush, with the process terminating thereafter.

Figure 9:
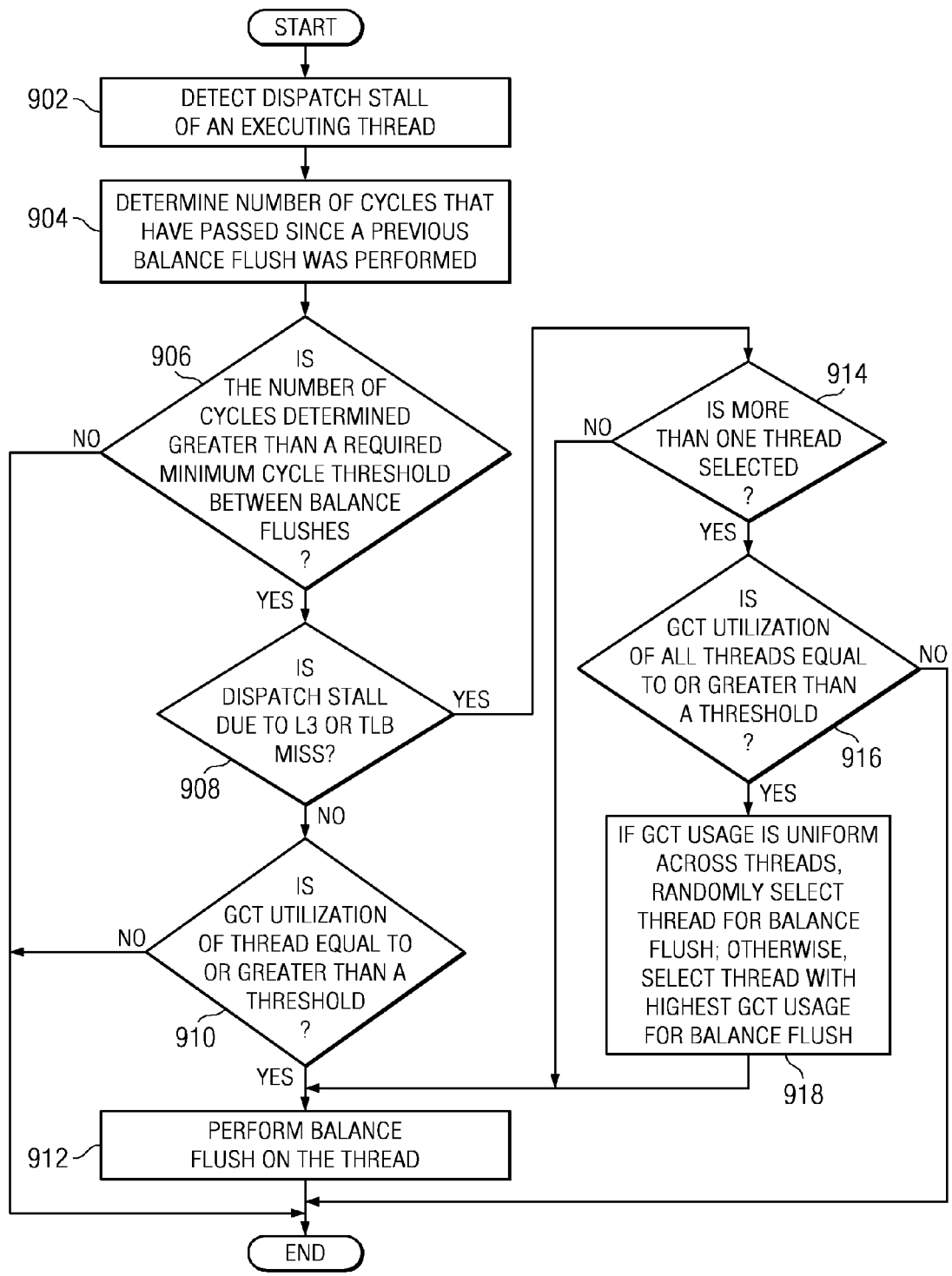
FIG. 9 illustrates a flowchart of an alternative process for balance flushing threads in accordance with the illustrative embodiments.

FIG. 9 illustrates a flowchart of a process for controlling the occurrence of balance flushes by preventing balance flushes from occurring within a defined number of cycles of another balance flush in accordance with the illustrative embodiments. The process may be used in tandem with the process in FIG. 6 for overriding default or current fetch and dispatch thread priority settings associated with bits set in the thread switch control registers.

The process begins with detecting a dispatch stall for a thread in the process pipeline (step 902). When detecting a dispatch stall, the process determines the number of cycles that have passed since a previous balance flush was performed (step 904). The process then makes a determination as to whether the number of cycles that have passed is greater than a minimum number of cycles required for performing a subsequent balance flush (step 906). If the number of cycles that have passed is not greater than the minimum number of cycles required for performing a subsequent balance flush ('no' output of step 906), the process ignores the dispatch stall on that thread and does not consider the thread for a balance flush, with the process terminating thereafter.

If the number of cycles that have passed is greater than the minimum number of cycles required for performing a subsequent balance flush ('yes' output of step 906), the process determines if the dispatch stall is due to a L3 cache miss or a TLB miss (step 908). If the dispatch stall is not due to a L3 cache miss or a TLB miss ('no' output of step 908), the process makes a determination whether the thread is a candidate for balance flush based on the GCT utilization of the thread (as defined by balance flush bits <gctbf-b:2> (510 in FIG. 5) in the thread switch control register) (step 910). If the GCT utilization of the thread is equal to or greater than a utilization threshold value as described by the <gctbf-b:2> field (510 in FIG. 5) ('yes' output of step 910), the process initiates a balance flush on the target thread to flush the target thread entirely from the system to restore resource usage fairness or balance (step 912). The balance flush includes flushing the execution units, the global completion table, and the effective address table for the selected thread. If the GCT utilization of the thread is less than a utilization threshold value as described by the <gctbf-b:2> field (510 in FIG. 5) ('no' output of step 910), the process does not consider the thread for balance flush, and the process terminates thereafter.

If the process determines that the dispatch stall is due to a L3 cache miss or a TLB miss ('yes' output of step 908), the process determines if more than one thread is selected based on the L3 cache or TLB misses (step 914). If no more than one thread is selected ('no' output of step 914), the process initiates a balance flush on the target thread to flush the target thread entirely from the system to restore resource usage fairness or balance (step 912).

If more than one thread is selected based on L3 cache or TLB misses ('yes' output of step 914), the process determines whether the <gctbf-a:2> (field 508 in FIG. 5) condition is satisfied for all of the threads (step 916). For threads that meet the <gctbf-a:2> criteria ('yes' output of step 916), the process selects the thread with the most global completion table usage for balance flush or, if GCT usage is uniform across the threads, the process randomly selects a thread for balance flush (step 918). The process then initiates a balance flush on the selected thread to flush the target thread entirely from the system to restore resource usage fairness or balance (step 912). For threads that do not meet the <gctbf-a:2> criteria ('no' output of step 916), the process terminates thereafter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of managing thread priority settings to achieve a target power efficiency mode of a processor, the computer implemented method comprising:
   receiving an instruction or command from a higher-level system control to set a current power consumption of the processor;
   determining a target power efficiency mode for the processor;
   updating thread priority settings in a thread switch control register for an executing thread to control at least one of balance flush speculation or dispatch flush speculation to achieve the target power efficiency mode;
     wherein the updating step further comprises: updating the thread priority settings to enable balance flush speculation and dispatch flush speculation if a global completion table entry threshold number is met to achieve one of a medium power efficiency mode and a low power efficiency mode;
   responsive to detecting the thread is a dispatch stall, determining whether a balance flush miss cycle counter for the executing thread is less than a threshold number of cycles;
   responsive to a determination that the balance flush miss cycle counter for the executing thread is less than a threshold number of cycles, performing a balance flush on the executing thread; and
   responsive to a determination that the balance flush miss cycle counter for the executing thread is not less than a threshold number of cycles, ignoring the dispatch stall of the executing thread.

2. The computer implemented method of claim 1, wherein the updating step overrides default thread priority settings for maximizing processor performance in the thread switch control register.

3. The computer implemented method of claim 1, wherein the target power efficiency mode is one of a high power efficiency mode, a medium power efficiency mode, a low power efficiency mode, and a default power efficiency mode.

4. The computer implemented method of claim 3, wherein the updating step further comprises:
   updating the thread priority settings to disable all balance flush speculation and dispatch flush speculation to achieve the high power efficiency mode.

5. The computer implemented method of claim 3, wherein the updating step further comprises:
   updating the thread priority settings to enable balance flush speculation and dispatch speculation for maximizing processor performance to achieve the default power efficiency mode.

6. The computer implemented method of claim 1, wherein the higher-level system control is one of an on chip hardware controller and an off chip hardware controller.

7. The computer implemented method of claim 1, wherein the balance flush miss cycle counter is defined in the thread switch control register.

8. The computer implemented method of claim 1, further comprising:
   responsive to detecting a dispatch stall, determining whether a minimum number of cycles has passed since a balance flush was previously performed;
   responsive to a determination that the minimum number of cycles has passed since a balance flush was previously performed, performing a balance flush on the executing thread; and
   responsive to a determination that the minimum number of cycles has not passed since a balance flush was previously performed, ignoring the dispatch stall of the executing thread.

9. The computer implemented method of claim 1, wherein the dispatch stall is caused by one of a level 3 cache miss and a translation lookaside buffer miss.

10. A data processing system for managing thread priority settings to achieve a target power efficiency mode of a processor, the data processing system comprising:
    a bus;
    a storage device connected to the bus, wherein the storage device contains computer usable code;
    at least one managed device connected to the bus; a communications unit connected to the bus; and a processing unit connected to the bus, wherein the processing unit executes the computer usable code to receive an instruction or command from a higher-level system control to set a current power consumption of the processor; determine a target power efficiency mode for the processor;

update thread priority settings in a thread switch control register for an executing thread to control at least one of balance flush speculation or dispatch flush speculation to achieve the target power efficiency mode;

wherein the updating step further comprises: updating the thread priority settings to enable balance flush speculation and dispatch flush speculation if a global completion table entry threshold number is met to achieve one of a medium power efficiency mode and a low power efficiency mode;

responsive to detecting the thread is a dispatch stall, determine whether a balance flush miss cycle counter for the executing thread is less than a threshold number of cycles;

responsive to a determination that the balance flush miss cycle counter for the executing thread is less than a threshold number of cycles, perform a balance flush on the executing thread; and responsive to a determination that the balance flush miss cycle counter for the executing thread is not less than a threshold number of cycles, ignore the dispatch stall of the executing thread.

11. A computer program product of managing thread priority settings to achieve a target power efficiency mode of a processor, the computer program product comprising:

a non-transitory computer usable medium having computer usable program code tangibly embodied thereon, the computer usable program code comprising:

computer usable program code for receiving an instruction or command from a higher-level system control to set a current power consumption of the processor;

computer usable program code for determining a target power efficiency mode for the processor;

computer usable program code for updating thread priority settings in a thread switch control register for an executing thread to control at least one of balance flush speculation or dispatch flush speculation to achieve the target power efficiency mode;

computer usable program code for updating the thread priority settings to enable balance flush speculation and dispatch flush speculation if a global completion table entry threshold number is met to achieve one of a medium power efficiency mode and a low power efficiency mode;

computer usable program code for determining, in response to detecting the thread is a dispatch stall, whether a balance flush miss cycle counter for the executing thread is less than a threshold number of cycles;

computer usable program code for performing a balance flush on the executing thread in response to a determination that the balance flush miss cycle counter for the executing thread is less than a threshold number of cycles; and computer usable program code for ignoring the dispatch stall of the executing thread in response to a determination that the balance flush miss cycle counter for the executing thread is not less than a threshold number of cycles.

12. The computer program product of claim 11, wherein the computer usable program code for updating thread priority settings overrides default thread priority settings for maximizing processor performance in the thread switch control register.

13. The computer program product of claim 11, wherein the target power efficiency mode is one of a high power efficiency mode, a medium power efficiency mode, a low power efficiency mode, and a default power efficiency mode.

14. The computer program product of claim 13, wherein the computer usable program code for updating thread priority settings further comprises:

computer usable program code for updating the thread priority settings to disable all balance flush speculation and dispatch flush speculation to achieve the high power efficiency mode.

15. The computer program product of claim 11, wherein the dispatch stall is caused by one of a level 3 cache miss and a translation lookaside buffer miss.

16. The computer program product of claim 11, further comprising:

computer usable program code for determining, in response to detecting a dispatch stall, whether a minimum number of cycles has passed since a balance flush was previously performed;

computer usable program code for performing a balance flush on the executing thread in response to a determination that the minimum number of cycles has passed since a balance flush was previously performed; and computer usable program code for ignoring the dispatch stall of the executing thread in response to a determination that the minimum number of cycles has not passed since a balance flush was previously performed.

* * * * *